United States Patent

[11] 3,570,639

| [72] | Inventors | Gary D. Fredell<br>East Moline;<br>Frederick E. Erickson, Port Byron, Ill. |
|---|---|---|
| [21] | Appl. No. | 814,952 |
| [22] | Filed | Apr. 10, 1969 |
| [45] | Patented | Mar. 16, 1971 |
| [73] | Assignee | Gulf & Western Industries<br>New York, N.Y. |

[54] SOLENOID-OPERATED SPRING CLUTCH
6 Claims, 5 Drawing Figs.

[52] U.S. Cl. .................................................. 192/81,
192/26; 192/40
[51] Int. Cl. ..............................................F16d 11/06,
B16d 13/08
[50] Field of Search........................................... 192/26, 40,
41 (S), 81

[56] References Cited
UNITED STATES PATENTS

| 2,829,748 | 4/1958 | Sacchini et al................ | 192/26 |
| 3,340,975 | 9/1967 | Erickson ...................... | 192/81 |

*Primary Examiner*—Allan D. Herrmann
*Attorney*—Meyer, Tilberry & Body

ABSTRACT: A clutch mechanism including a drive shaft with first and second segments integral with each other, the first segment having a diameter greater than the diameter of the second segment. Coaxially supported on the second segment is a driven drum having another diameter substantially equal to the diameter of the first segment and adjacent thereto with a bearing coaxially disposed about a longitudinal portion of the driven drum. There is further provided a coiled spring having opposing free ends coaxially wrapped about adjacent portions of the first segment and the drum, the spring having an internal diameter sufficiently small relative to the diameters of the first segment and the drum that the spring is normally in resilient gripping relationship with the first segment and the drum, whereby the drive shaft transmits rotational forces to the drum. The free ends of the spring are concurrently engaged and rotated in opposite directions by clutch release means, whereby the internal diameter of the spring is sufficiently increased to release its gripping relationship with the first segment and the drum to prevent the transmission of rotational forces from the drive shaft to the drum.

PATENTED MAR 16 1971

INVENTORS
FREDERICK E. ERICKSON
GARY D. FREDELL

BY *Meyer, Tilberry & Body*

ATTORNEYS

PATENTED MAR 16 1971 3,570,639

INVENTORS
FREDERICK E. ERICKSON
GARY D. FREDELL
BY
Meyer, Tilberry & Body
ATTORNEYS

SOLENOID-OPERATED SPRING CLUTCH

This invention pertains to the clutch art and, more particularly, to an improved spring clutch mechanism.

The invention is particularly applicable for use with small motors, such as electrical motors of the low r.p.m. type and will be described with particular reference thereto; although it will be appreciated that the invention may be used in various applications which require a spring clutch mechanism.

A spring clutch presently in use includes a driving drum mounted on a motor drive shaft, a driven drum coaxial with and adjacent the driven drum and mounted on the drive shaft. A coil spring having an inner diameter slightly smaller than the diameter of the drums is normally in resilient gripping relationship with the drums to provide clutch engagement. When the ends of the coil spring are turned by clutch release means relative to one another in a direction tending to unwind the spring, the inner diameter of the spring is increased causing the gripping relationship to cease and disengage the clutch. The clutch release means is comprised of a pair of ratchet wheels, each wheel being supported on a respective drum and adapted to rotate the spring ends for disengaging the clutch.

Heretofore, the above described spring clutch mechanism has proved costly and complicated to manufacture due to the numerous components involved and the close-machining tolerances required therebetween. This is particularly true in respect to the driving and driven drums, whose outer adjacent surfaces must be in alignment if theclutch is to operate properly. Furthermore, the ratchet wheel supported on the driven drum induced high frictional forces thereon which affected the output efficiency.

The present invention contemplates a new and improved spring clutch mechanism which overcomes the above referred difficulties, and others, by providing a spring clutch which has fewer parts, reduced frictional forces, is easier to manufacture and assemble and results in an economical mechanism.

In accordance with the present invention there is provided a clutch mechanism including a drive shaft with first and second segments integral with each other, the first segment having a diameter greater than the diameter of the second segment. Coaxially supported on the second segment is a driven drum having a diameter substantially equal to the diameter of the first segment and adjacent thereto with a fixed bearing coaxially disposed about a longitudinal portion of the driven drum. There is further provided a coiled spring having opposing free ends coaxially wrapped about adjacent portions of the first segment and the drum, the spring having an internal diameter sufficiently small relative to the diameters of the first segment and the drum that the spring is normally in resilient gripping relationship with the first segment and the drum, whereby the drive shaft transmits rotational forces to the drum. The free ends of the spring are concurrently engaged and rotated in opposite directions by clutch release means whereby the internal diameter of the spring is sufficiently increased to release its gripping relationship with the first segment and the drum to prevent the transmission of rotational forces from the drive shaft to the drum.

The principal object of the present invention is to provide an improved spring clutch mechanism capable of accurate alignment tolerances between the driving member and the driven member.

Another object of the present invention is to provide an improved spring clutch mechanism which has fewer components, thereby facilitating the mode of manufacture.

A further object of the present invention is to provide an improved spring clutch mechanism which has greater efficiency due to reduced frictional forces.

A still further object of the present invention is to provide an improved spring clutch mechanism which is relatively inexpensive to manufacture and which is particularly applicable for use in conjunction with small motors.

The foregoing and other objects and advantages of the invention will become more readily apparent from the following description of the preferred embodiment of the invention as read in connection with the accompanying drawings in which.

Figure 1:
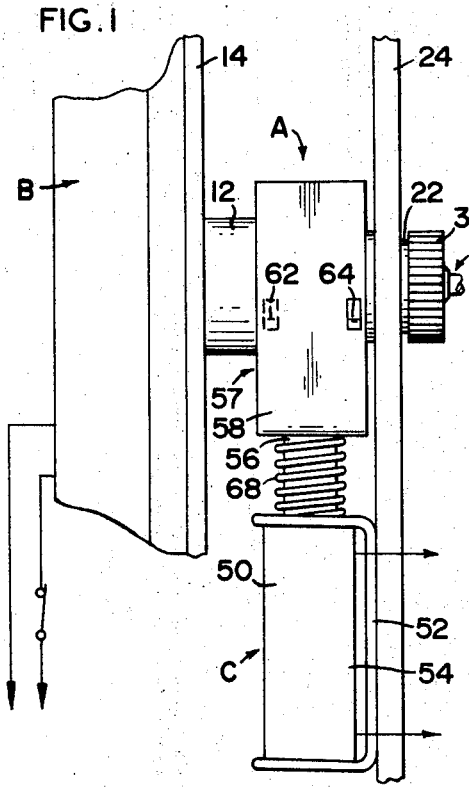
FIG. 1 is an elevational view of a solenoid operated clutch mechanism embodying the present invention and used in conjunction with an electric motor.

Referring now to the drawings wherein the showings are for the purpose of illustrating the preferred embodiment of the invention only and not for the purposes of limiting same, FIG. 1 shows a spring clutch mechanism A embodying the present invention, which is being used in conjunction with an electric motor B, and having clutch release means C.

Figure 2:
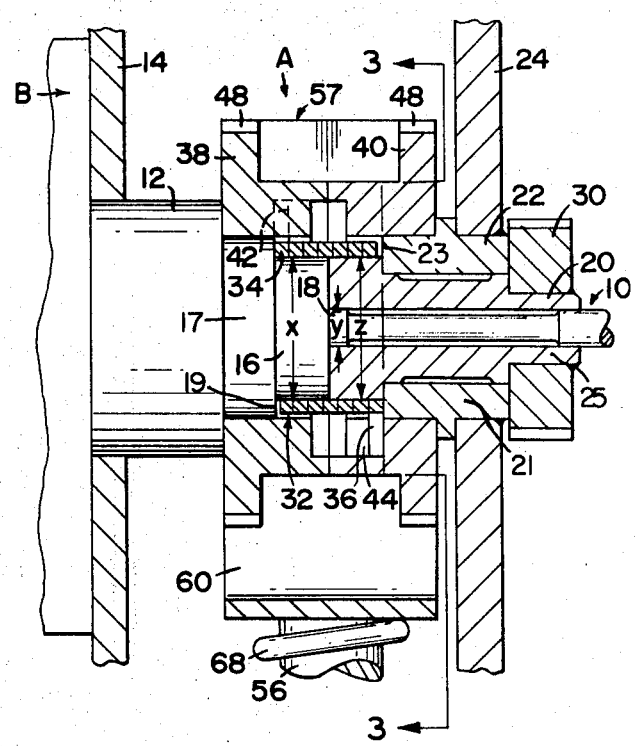
FIG. 2 is a fragmentary sectional view of the spring clutch mechanism of FIG. 1 showing the clutch in the engaged condition.

Referring now to FIG. 2, the motor B has a drive shaft, referred to generally by the reference numeral 10, journaled in a motor bearing 12 and extending through a motor-mounting plate 14. The drive shaft 10 is comprised of a first segment 16, a second segment 18 and a third segment 17 integral with each other. The first segment 16 has a diameter designated by the dimension $x$, and the second segment 18 has a diameter designated by the dimension $y$; the diameter of the first segment being greater than the diameter of the second segment; and hence the dimension $x$ is greater than the dimension $y$. Third segment 17 is greater in diameter than first segment 16 to provide a shoulder 19 therebetween.

Coaxially supported on the second segment 18, and adjacent the first segment 16, is a driven drum 20 having at least a first portion of its diameter, designated by the dimension $z$, substantially equal to the diameter of the first segment. Therefore, the dimension $x$ is substantially equal to the dimension $z$; and the adjacent outer surfaces of the first segment 16 and the drum are in alignment. A second portion 21 of the driven drum 20 is journaled in a fixed bearing 22 and extends through a front mounting plate 24. The bearing 22 is secured to the front mounting plate 24 to prevent it from moving during rotation of the drum 20. The bearing 22 is of larger diameter than the first portion of drum 20 to provide a shoulder 23 therebetween.

In accordance with the present invention there is affixed to the outer end of a third portion 25 of the drum 20, and forward of the front mounting plate 24, a means for transmitting the rotational output of the drum to an apparatus (not shown) which is to be operated by the motor B through the clutch mechanism A. The transmitting means may take many forms, such as a belt or cam, however, in accordance with the preferred embodiment of the invention this takes the form of a gear 30.

Figure 3:
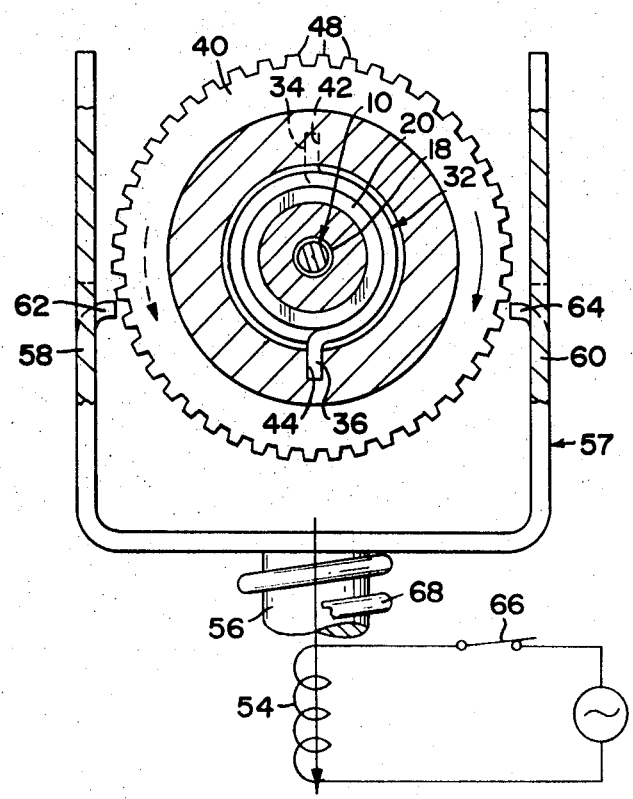
FIG. 3 is a fragmentary transverse sectional view taken on line 3-3 of FIG. 2 and including a schematic diagram of the solenoid control circuit.
Figure 4:
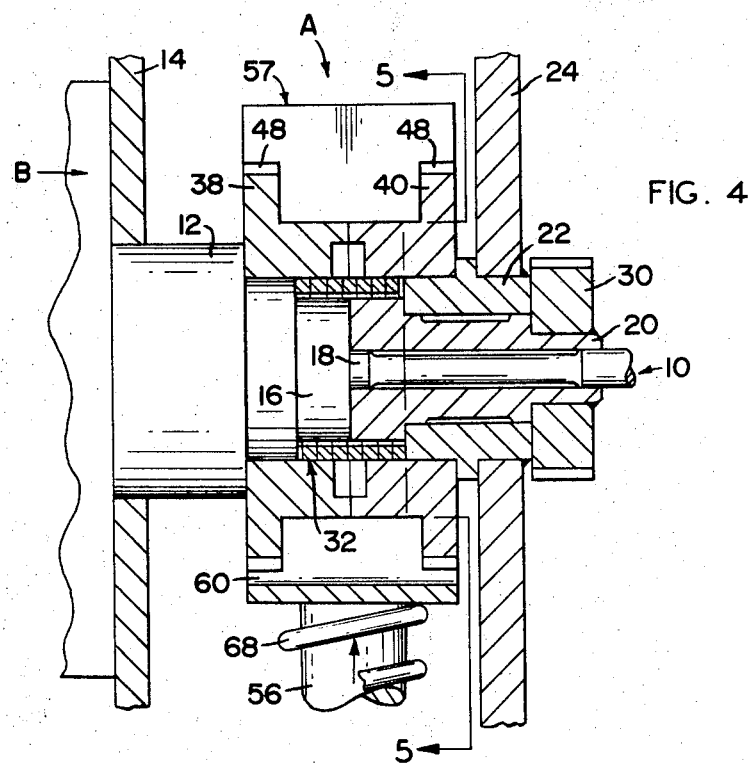
FIG. 4 is a fragmentary sectional view of the spring clutch mechanism of FIG. 1 showing the clutch in the disengaged condition.
Figure 5:
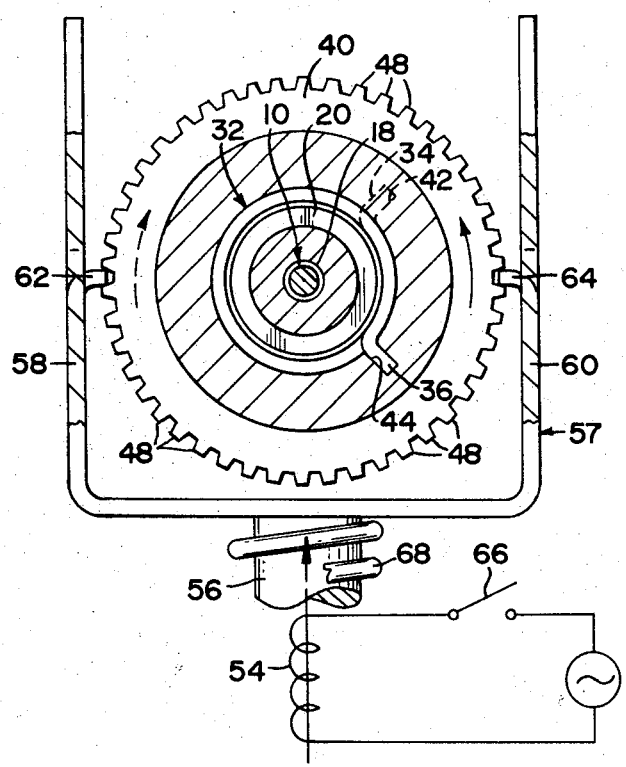
FIG. 5 is a fragmentary transverse sectional view taken on line 5-5 of FIG. 4 and including a schematic diagram of the solenoid control circuit.

Wrapped about the adjacent portions of the first segment 16 and the drum 20 is a coil spring 32 formed of rectangular stock and having its helices closely adjacent one another. The internal diameter of the coil spring 32, in its normal unstressed condition, is sufficiently small relative to the diameters of the first segment 16 and the drum 20 that it is in resilient gripping relationship with the first segment and the drum to provide clutch engagement as shown in FIGS. 2 and 3. The free ends 34, 36 of the spring 32 project outwardly as shown in FIG. 3, and by rotating these free ends in opposing directions the internal diameter of the spring is sufficiently increased to release its gripping relationship with the first segment 16 and the drum 20, thereby disengaging the clutch, as shown in FIGS. 4 and 5, to prevent the transmission of rotational forces from the drive shaft 10 to the drum 20.

In accordance with the present invention there is provided a clutch release means C for concurrently engaging and rotating the free ends 34, 36 of the spring in opposing directions. The clutch release means C may take many forms, however in the preferred embodiment of the invention it is comprised of first and second actuating wheels 38, 40 respectively; the first wheel being coaxially disposed on the third segment 17 and the second wheel being coaxially disposed on the bearing 22. The first wheel 38 has a radial slot 42 formed therein which receives the free end 34 of the spring 32, and the second wheel 40 has a radial slot 44 formed therein which receives the other free end 36 of the spring. The two wheels 38, 40 may be concurrently rotated in opposing directions relative to one another in order to increase the internal diameter of the spring 32, whereby the clutch will disengage as shown in FIGS. 4 and 5. Each of teeth wheels 38, 40 has a plurality of radially extending teeth 48 configured about its periphery.

The clutch release means C heretofore described further includes a solenoid 50, which is attached to the rearward side of the front mounting plate 24 below the shaft 10 by a bracket 52. The solenoid 50 has a coil 54 and a plunger 56 which moves linearly from an uppermost to a lowermost position in a direction perpendicular to the axis of the shaft 10. Affixed to the upper end of the plunger 56 is a mount 57 having two upwardly extending parallel arms 58, 60 which are sufficiently spaced apart to permit the wheels 38, 40 to be intermediate the arms. Oppositely mounted on the inner face of the arms 58, 60 are inwardly extending first and second actuating rods 62, 64 respectively. The first rod 62 is adapted to engage the teeth 48 on the first wheel 38 and the second rod 64 is adapted to engage the teeth on the second wheel 40.

Energization of the coil 54 is controlled by means of a switch 66. When the switch 66 is open the coil 54 is deenergized, and return spring 68 biases plunger 56 and mount 57 to the uppermost position. When the switch 66 is closed the coil 54 is energized causing the plunger 56 and mount 57 to move linearly from the uppermost to the lowermost position.

Referring now to FIGS. 1 through 5, wherein the operation of the clutch mechanism will be described in detail. For purposes of explanation assume that the switch 66 is open and that the motor B has been energized. The plunger 56 is in the uppermost position, being biased there by return spring 68. In this position, as best shown in FIG. 5, the actuating rods 62, 64 are engaging the teeth 48 on their respective wheels 38, 40 and maintaining the clutch in a disengaged state. Thus, although the motor B is operating and hence drive shaft 10 is rotating, the rotational forces are not being transmitted to drum 20.

Assume that it is now desired to engage the clutch in order to transmit the power output of the motor B to the drum 20. The switch 66 is closed, thereby energizing the coil 54 and causing the plunger 56 to move linearly downward from the uppermost to the lowermost position. As the plunger 56 moves downward the actuating rods 62, 64 become disengaged from the teeth 48 of their respective wheels 38, 40. The unwinding forces having been removed from the free ends 34, 36, and the spring 32 returns to its normal resilient gripping relationship with the segment 16 of shaft 10 and the drum 20, as best shown in FIG. 3. So long as the switch 66 is closed the clutch will remain in the engaged position and the drive shaft 10 will transmit rotational forces to the drum 20.

In view of the foregoing, it can be readily seen that the spring clutch mechanism heretofore described is capable of accurate alignment tolerances and provides greater mechanical efficiency due to reduced frictional forces.

We claim:
1. A clutch mechanism comprising:
 a. a drive shaft having first and second coaxial segments integral with each other;
 b. said first segment having a diameter greater than the diameter of said second segment;
 c. a driven drum coaxially supported on said second segment and having a first portion with a diameter substantially equal to the diameter of said first segment, and adjacent thereto;
 d. a fixed bearing coaxially disposed about a second portion of said drum and having a diameter greater than the diameter of the first portion of said drum defining a shoulder therebetween;
 e. a coiled spring having opposing free ends coaxially wrapped about said first segment of said drive shaft and said first portion of said drum;
 f. said spring having an internal diameter sufficiently small relative to the diameters of said first segment and said first portion that said spring is normally in resilient gripping relationship with said first segment and said first portion, whereby said drive shaft transmits rotational forces to said drum; and
 g. clutch release means for concurrently engaging and rotating the free ends of said spring in opposing directions, whereby the internal diameter of said spring is sufficiently increased to release its gripping relationship with said first segment and said first portion to prevent the transmission of rotational forces from said drive shaft to said drum.

2. A clutch mechanism comprising:
 a. a drive shaft having first, second, and third coaxial segments integral with each other;
 b. said first segment having a diameter greater than the diameter of said second segment;
 c. a driven drum coaxially supported on said second segment and having a first portion with a diameter substantially equal to the diameter of said first segment, and adjacent thereto;
 d. a fixed bearing coaxially disposed about a second portion of said drum;
 e. a coiled spring having opposing free ends coaxially wrapped about said first segment of the drive shaft and said first portion of said drum;
 f. said spring having an internal diameter sufficiently small relative to the diameters of said first segment and said first portion that said spring is normally in resilient gripping relationship with said first segment and said first portion, whereby said drive shaft transmits rotational forces to said drum;
 g. clutch release means for concurrently engaging and rotating the free ends of said spring in opposing directions whereby the internal diameter of said spring is sufficiently increased to release its gripping relationship with said first segment and said first portion to prevent the transmission of rotational forces from said drive shaft to said frame; and
 h. said clutch release means including first and second actuating wheels, said first wheel coaxially disposed on said third segment and secured to the respective free end of said spring, and said second wheel coaxially disposed on said fixed bearing and secured to the respective other free end of said spring.

3. The clutch mechanism defined in claim 2, wherein said actuating wheels have a plurality of radially extending teeth configured about their periphery.

4. The clutch mechanism defined in claim 3, further including a mount, said mount having a pair of actuating rods secured thereto, said rods adapted to engage said teeth on said wheel.

5. The clutch mechanism defined in claim 4, wherein electromagnetic means are provided for displacing said mount, whereby said actuating rods engage said actuating wheels.

6. The clutch mechanism defined in claim 5, wherein said electromagnetic means is a solenoid having a linearly movable plunger connected to said mount for displacing said mount.